US012699215B2

(12) United States Patent
Orillard et al.

(10) Patent No.: US 12,699,215 B2
(45) Date of Patent: Aug. 4, 2026

(54) ARTICLE INCLUDING A NON-LIGHT-EMITTING VARIABLE TRANSMISSION DEVICE AND A COATING

(71) Applicant: SAGE ELECTROCHROMICS, INC., Faribault, MN (US)

(72) Inventors: Julien Orillard, Paris (FR); Alexandre Richard, Fribourg (CH); Paul C. Mogensen, Chantilly (FR); Nicolas Antoine Mercadier, Bulle (CH); Henry Kelley, Faribault, MN (US); Mathew Bowser, Faribault, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 659 days.

(21) Appl. No.: 17/820,813

(22) Filed: Aug. 18, 2022

(65) Prior Publication Data

US 2022/0390804 A1     Dec. 8, 2022

Related U.S. Application Data

(63) Continuation of application No. 16/181,848, filed on Nov. 6, 2018, now Pat. No. 11,442,325.
(Continued)

(51) Int. Cl.
*G02B 5/28* (2006.01)
*G02F 1/157* (2006.01)

(52) U.S. Cl.
CPC ............. *G02B 5/285* (2013.01); *G02B 5/286* (2013.01); *G02F 1/157* (2013.01)

(58) Field of Classification Search
CPC .......... G02B 5/285; G02B 5/286; G02F 1/157
(Continued)

(56) References Cited

U.S. PATENT DOCUMENTS 4,419,386 A      12/1983   Gordon
5,239,406 A  *   8/1993   Lynam .............. B32B 17/10339
                                                           359/275
(Continued)

FOREIGN PATENT DOCUMENTS

EP          0253713 A1      1/1988
EP          0382623 A1      8/1990
(Continued)

OTHER PUBLICATIONS

Wikipedia webpage "Thin-film interference" (Year: 2017).*
(Continued)

*Primary Examiner* — George G. King
(74) *Attorney, Agent, or Firm* — Abel Schillinger, LLP; Robert Young

(57) ABSTRACT

An article can include a non-light-emitting, variable transmission device and a coating disposed between the non-light-emitting, variable transmission device and an ambient outside the article. In an embodiment, the article has a ΔE of at most 6.5. In another embodiment, the coating includes a plurality of layers including a first layer having a refractive index of at least 2.2 and a thickness of at least 10 nm. The coating can be used to help reduce color differences seen when the non-light-transmitting, variable transmission device is taken to different transmission states. In a particular embodiment, the coating can provide a good balance between color difference and luminous transmission.

14 Claims, 3 Drawing Sheets

Related U.S. Application Data

(60) Provisional application No. 62/582,098, filed on Nov. 6, 2017.

(58) Field of Classification Search
USPC .......................................................... 359/587
See application file for complete search history.

(56) References Cited

U.S. PATENT DOCUMENTS

| | | | |
|---|---|---|---|
| 5,321,544 | A | 6/1994 | Parkhe et al. |
| 5,370,775 | A | 12/1994 | Parkhe |
| 5,404,244 | A | 4/1995 | Van Dine et al. |
| 5,659,417 | A | 8/1997 | Van Dine et al. |
| 5,724,175 | A | 3/1998 | Hichwa et al. |
| 5,724,177 | A | 3/1998 | Ellis, Jr. et al. |
| 5,755,537 | A | 5/1998 | Lubbering |
| 5,825,526 | A | 10/1998 | Bommarito et al. |
| 6,037,289 | A | 3/2000 | Chopin et al. |
| 6,055,088 | A | 4/2000 | Fix et al. |
| 6,502,423 | B1 | 1/2003 | Ostendarp et al. |
| 6,746,775 | B1 | 6/2004 | Boire et al. |
| 6,872,453 | B2 | 3/2005 | Arnaud et al. |
| 7,074,486 | B2 | 7/2006 | Boire et al. |
| 7,372,610 | B2 | 5/2008 | Burdis et al. |
| 7,710,671 | B1 | 5/2010 | Kwak et al. |
| 8,441,707 | B2 | 5/2013 | Lam et al. |
| 8,506,096 | B2 | 8/2013 | McCabe et al. |
| 9,091,896 | B2 | 7/2015 | Selles et al. |
| 10,761,393 | B2 | 9/2020 | Trajkovska-Broach et al. |
| 2001/0021066 | A1* | 9/2001 | Tonar ................. G02B 27/0006 359/604 |
| 2002/0192473 | A1 | 12/2002 | Gentilhomme et al. |
| 2004/0169789 | A1* | 9/2004 | Mathey ............. B32B 17/10504 349/86 |
| 2004/0229049 | A1* | 11/2004 | Boire ................ B32B 17/10788 428/428 |
| 2004/0233552 | A1* | 11/2004 | Tonar ........................ G02B 1/14 359/507 |
| 2006/0158735 | A1 | 7/2006 | Tonar et al. |
| 2007/0188871 | A1* | 8/2007 | Fleury ................. C03C 17/3435 359/586 |
| 2009/0246514 | A1 | 10/2009 | Chiu et al. |
| 2011/0070417 | A1 | 3/2011 | Reutler et al. |
| 2011/0146172 | A1 | 6/2011 | Mauvernay et al. |
| 2011/0262694 | A1 | 10/2011 | Janssen et al. |
| 2011/0305853 | A1 | 12/2011 | Raymond et al. |
| 2012/0028009 | A1 | 2/2012 | Gerardin et al. |
| 2014/0268283 | A1 | 9/2014 | Chandrasekhar |
| 2014/0320947 | A1 | 10/2014 | Egerton et al. |
| 2016/0122238 | A1 | 5/2016 | Roquiny et al. |
| 2017/0166134 | A1 | 6/2017 | Gao et al. |
| 2018/0364541 | A1 | 12/2018 | Turner et al. |
| 2020/0024185 | A1* | 1/2020 | Lee .......................... C23C 14/10 |

FOREIGN PATENT DOCUMENTS

| | | | |
|---|---|---|---|
| EP | 0408427 | A1 | 1/1991 |
| EP | 0518754 | A1 | 12/1992 |
| EP | 0521602 | A1 | 1/1993 |
| EP | 0532408 | A1 | 3/1993 |
| EP | 0575207 | A1 | 12/1993 |
| EP | 0612826 | A1 | 8/1994 |
| EP | 0670346 | A1 | 9/1995 |
| EP | 0825478 | A1 | 2/1998 |
| EP | 0831360 | A1 | 3/1998 |
| EP | 2583135 | B1 | 4/2013 |
| FR | 2781062 | A1 | 1/2000 |
| FR | 2829723 | A1 | 3/2003 |
| JP | 57158623 | A | 9/1982 |
| JP | 59195629 | A | 11/1984 |
| JP | H10114007 | A | 5/1998 |
| JP | 2010108684 | A | 5/2010 |
| JP | 2013007935 | A | 1/2013 |
| JP | 2015099888 | A | 5/2015 |
| JP | 2015111171 | A | 6/2015 |
| WO | 2000003290 | A1 | 1/2000 |
| WO | 0208826 | A1 | 1/2002 |
| WO | 2002006889 | A1 | 1/2002 |
| WO | 2003098339 | A2 | 11/2003 |
| WO | 2005007398 | A2 | 1/2005 |
| WO | 2010007303 | A1 | 1/2010 |
| WO | 2011161110 | A1 | 12/2011 |
| WO | 2013141051 | A1 | 9/2013 |

OTHER PUBLICATIONS

"Glass in building—Determination of luminous and solar characteristics of glazing," European Standard for Public Review, 2010, 62 pages, European Committee for Standardization.

International Search Report and Written Opinion for PCT/EP2011/060363, mailed Sep. 22, 2011, 9 pages.

International Search Report and Written Opinion for PCT/EP2011/061407, mailed Sep. 27, 2011, 11 pages.

International Search Report and Written Opinion for PCT/EP2011/061408, mailed Oct. 10, 2011, 2011, 11 pages.

International Search Report and Written Opinion for PCT/US2018/059368, mailed May 29, 2019, 12 pages.

* cited by examiner

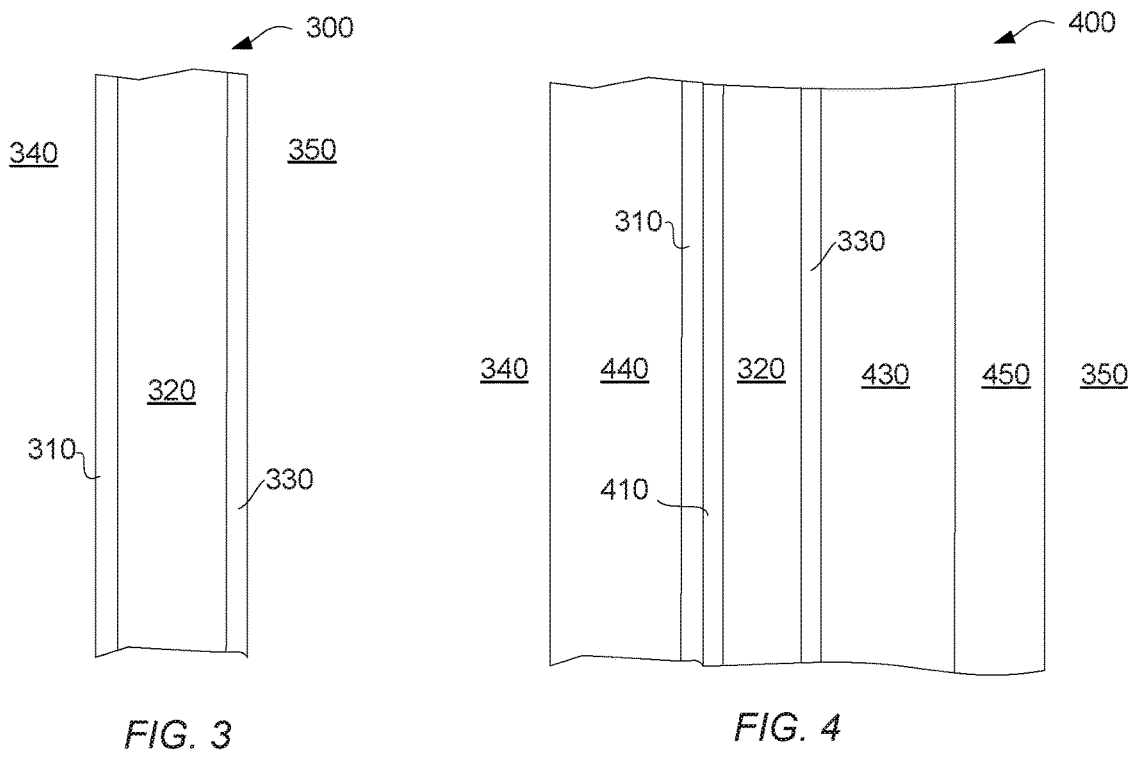
*FIG. 3*
*FIG. 4*
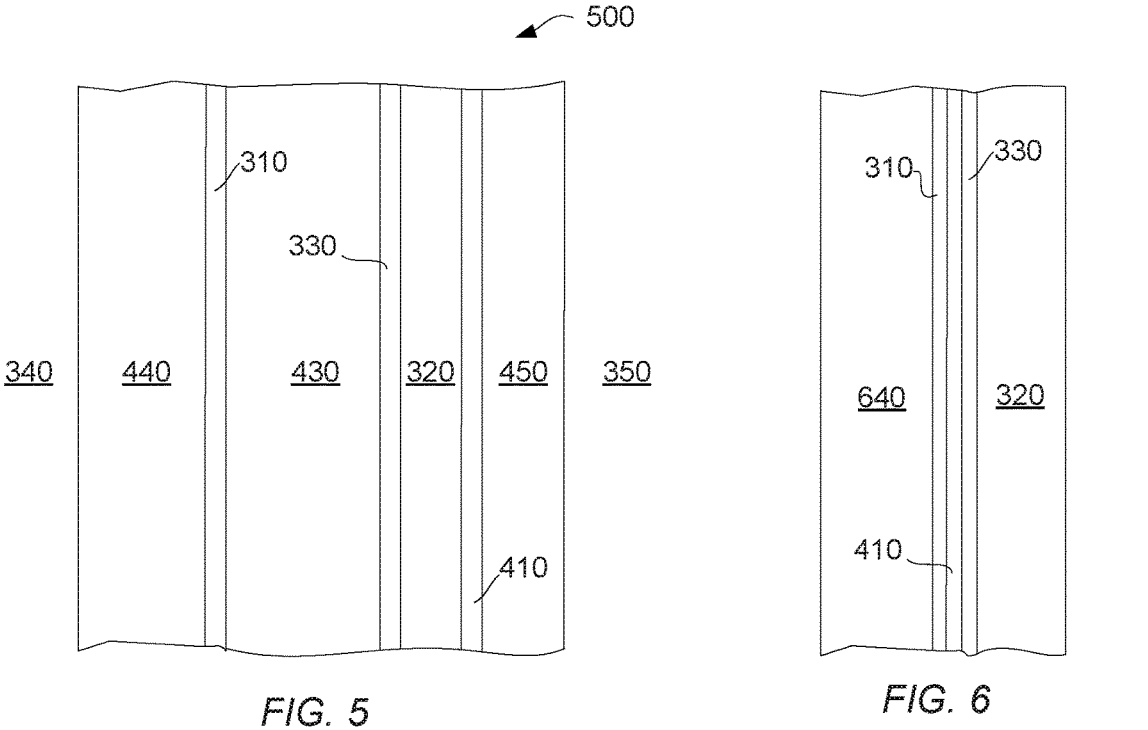
*FIG. 5*
*FIG. 6*

ARTICLE INCLUDING A NON-LIGHT-EMITTING VARIABLE TRANSMISSION DEVICE AND A COATING

CROSS-REFERENCE TO RELATED APPLICATION

This application is a continuation and claims priority to U.S. patent application Ser. No. 16/181,848, entitled "ARTICLE INCLUDING A NON-LIGHT-EMITTING VARIABLE TRANSMISSION DEVICE AND A COATING," by Julien ORILLARD et al., filed Nov. 6, 2018, which claims priority under 35 U.S.C. § 119(e) to U.S. Provisional Application No. 62/582,098, entitled "ARTICLE INCLUDING A NON-LIGHT-EMITTING VARIABLE TRANSMISSION DEVICE AND A COATING," by Julien Orillard et al., filed Nov. 6, 2017, which is assigned to the current assignee hereof and is incorporated herein by reference in its entirety.

FIELD OF THE DISCLOSURE

The present disclosure is related to articles including non-light-emitting variable transmission devices and coatings.

RELATED ART

A non-light-emitting variable transmission device can include an electrochromic stack where transparent conductive layers are used to provide electrical connections for the proper operation of the electrochromic stack. Buildings can be constructed with architectural glass having non-light-emitting variable transmission devices. Along a wall, different non-light-emitting variable transmission devices may be in different transmission states. A non-light-emitting variable transmission device of a window can be in a relatively high transmission state, and another non-light-emitting variable transmission device in a different window may be in a relatively low transmission state. From the outside of the building, the windows may appear as having different colors, even when the two windows are substantially identical in construction. Further improvement in the appearance of windows with non-light-emitting variable transmission devices is desired.

BRIEF DESCRIPTION OF THE DRAWINGS

Embodiments are illustrated by way of example and are not limited in the accompanying figures.

FIG. 3 includes an illustration of a cross-sectional view of an article including a non-light-transmitting, variable transmission device and a coating in accordance with an embodiment.

FIG. 4 includes an illustration of a cross-sectional view of an article including a non-light-transmitting, variable transmission device and a coating in accordance with another embodiment.

FIG. 5 includes an illustration of a cross-sectional view of an article including a non-light-transmitting, variable transmission device and a coating in accordance with yet another embodiment.

FIG. 6 includes an illustration of a cross-sectional view of an article including a non-light-transmitting, variable transmission device and a coating in accordance with a further embodiment.

Figure 1:
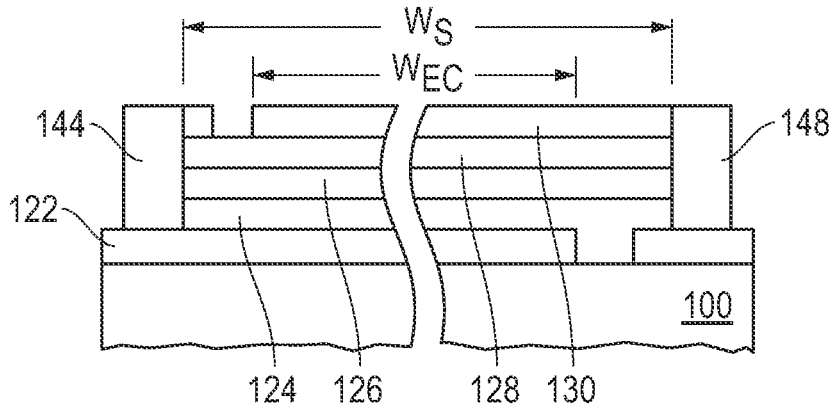
FIG. 1 includes an illustration of a cross-sectional view of a portion of a workpiece including a substrate and a set of layers.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

CIELab refers to color space adopted by the Commission Internationale de l'éclairage in 1931. L* represents the lightness of the color (0 corresponds to black while 100 corresponds to diffuse white; specular white may be higher), a* represents its position between red/magenta and green (negative values indicate green while positive values indicate magenta), and b* represents its position between yellow and blue (negative values indicate blue and positive values indicate yellow).

As used herein, luminous transmission is determined using BS EN 410 Glass in building—Determination of luminous and solar characteristics of glazing (2011). Luminous transmission is called "light transmittance" in BS EN 410.

Refractive indices in this specification are measured using light with an emission maximum at 550 nm.

Iron content in glass is the content of $Fe_2O_3$ in a batch of ingredients used to make the glass.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about," "approximately," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

An article can include a non-light-transmitting, variable transmission device and a coating. The coating can be used to help reduce color differences seen when the non-light-transmitting, variable transmission device is taken to different transmission states. When a plurality of non-light-transmitting, variable transmission devices are adjacent to one another, such as along a wall, the coating can help articles, such as windows, with the non-light-transmitting, variable transmission devices have a more uniform appearance when the non-light-transmitting, variable transmission devices are at different transmission levels. In a particular embodiment, the coating can provide a good balance between color difference and luminous transmission. The coating and articles including the coating are described in more detail below.

In the description below, a first portion describes the composition of a non-light-emitting, variable transmission device and an exemplary, non-limiting layout for the non-light-emitting device disposed on a glass substrate. A second portion addresses light and color. A third portion describes configurations of articles that each include the non-light-emitting, variable transmission device and a coating that are described in more detail later in this specification. A fourth portion describes details regarding the coating.

A. Non-Light-Emitting, Variable Transmission Device, Substrate, and Bus Bars.

FIG. 1 includes a cross-sectional view of a portion of substrate 100, a stack of layers 122, 124, 126, 128, and 130, and bus bars 144 and 148 overlying the substrate 100. In an embodiment, the substrate 100 can include a glass substrate, a sapphire substrate, an aluminum oxynitride substrate, or a spinel substrate. In another embodiment, the substrate 100 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The substrate 100 may or may not be flexible. The substrate 100 can have a refractive index in a range of 1.4 to 1.7. In an embodiment, the substrate 100 can have a thickness in a range of 0.5 mm to 4 mm thick. In another embodiment, the substrate 100 can include ultra-thin glass that is a mineral glass having a thickness in a range of 50 microns to 300 microns. In a further embodiment, the substrate 100 can be a float glass or a borosilicate glass. In a particular embodiment, the substrate 100 may be used for many different non-light-emitting variable transmission devices being formed and may referred to as a motherboard.

The compositions and thicknesses of the layers are described before describing their formation. Transparent conductive layers 122 and 130 can include a conductive metal oxide or a conductive polymer. Examples can include a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene), or the like. In another embodiment, the transparent conductive layers 122 and 130 can include gold, silver, copper, nickel, aluminum, or any combination thereof. The transparent conductive layers 122 and 130 can have the same or different compositions.

The set of layers further includes an electrochromic stack that includes the layers 124, 126, and 128 that are disposed between the transparent conductive layers 122 and 130. The layers 124 and 128 are electrode layers, wherein one of the layers is an electrochromic layer, and the other of the layers is an ion storage layer (also referred to as a counter electrode layer). The electrochromic layer can include an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $CO_2O_3$, $Mn_2O_3$, or any combination thereof and have a thickness in a range of 50 nm to 2000 nm. The ion storage layer can include any of the materials listed with respect to the electrochromic layer or $Ta_2O_5$, $ZrO_2$, $HfO_2$, $Sb_2O_3$, or any combination thereof, and may further include nickel oxide ($NiO$, $Ni_2O_3$, or combination of the two), and Li, Na, H, or another ion and have a thickness in a range of 80 nm to 500 nm. An ion conductive layer 126 (also referred to as an electrolyte layer) is disposed between the electrode layers 124 and 128, and has a thickness in a range of 20 microns to 60 microns. The ion conductive layer 126 allows ions to migrate therethrough and does not allow a significant number of electrons to pass therethrough. The ion conductive layer 126 can include a silicate with or without lithium, aluminum, zirconium, phosphorus, boron; a borate with or without lithium; a tantalum oxide with or without lithium; a lanthanide-based material with or without lithium; another lithium-based ceramic material; or the like. The ion conductive layer 126 is optional and, when present, may be formed by deposition or, after depositing the other layers, reacting portions of two different layers, such as the electrode layers 124 and 128, to form the ion conductive layer 126. After reading this specification, skilled artisans will appreciate that other compositions and thicknesses for the layers 122, 124, 126, 128, and 130 can be used without departing from the scope of the concepts described herein.

The layers 122, 124, 126, 128, and 130 can be formed over the substrate 100 with or without any intervening patterning steps, breaking vacuum, or exposing an intermediate layer to air before all the layers are formed. In an embodiment, the layers 122, 124, 126, 128, and 130 can be serially deposited. The layers 122, 124, 126, 128, and 130 may be formed using physical vapor deposition or chemical vapor deposition. In a particular embodiment, the layers 122, 124, 126, 128, and 130 are sputter deposited.

In the embodiment illustrated in FIG. 1, each of the transparent conductive layers 122 and 130 include portions removed, so that the bus bars 144 and 148 are not electrically connected to each other. Such removed portions are typically 20 nm to 2000 nm wide. In a particular embodiment, the bus bar 144 is electrically connected to the electrode layer 124 via the transparent conductive layer 122, and the bus bar 148 is electrically connected to the electrode layer 148 via the transparent conductive layer 130. The bus bars 144 and 148 include a conductive material. In an embodiment, each of the bus bars 144 and 148 can be formed using a conductive ink, such as a silver frit, which is printed over the transparent conductive layer 122. In another embodiment, one or both of the bus bars 144 and 148 can include a metal-filled polymer. In a particular embodiment (not illustrated), the bus bar 148 is a non-penetrating bus bar that can include the metal-filled polymer that is over the transparent conductive layer 130 and spaced apart from the layers 122, 124, 126, and 128. The viscosity of the precursor for the metal-filled polymer may be sufficiently high enough to keep the precursor from flowing through cracks or other microscopic defects in the underlying layers that might be otherwise problematic for the conductive ink. In still another embodiment, the bus bars 144 and 148 may be in the form of a conductive tape that is applied to the workpiece instead of printing the bus bars. The lower transparent conductive layer 122 does not need to be patterned in these last two embodiments.

In the embodiment illustrated, the width of the non-light-emitting variable transmission device $W_{EC}$ is a dimension that corresponds to the lateral distance between the removed portions of the transparent conductive layers 122 and 130. $W_{EC}$ corresponds to one of the planar dimensions of the tintable area of the non-light-emitting variable transmission device. $W_S$ is the width of the stack between the bus bars 144 and 148. The difference in $W_S$ and $W_{EC}$ is at most 5 cm, at most 2 cm, or at most 0.9 cm. Thus, most of the width of the stack corresponds to the operational part of the non-light-emitting variable transmission device that allows for different transmission states. In an embodiment, such operational part is the main body of the non-light-emitting variable transmission device and can occupy at least 90%, at least 95%, at least 98% or more of the area between the bus bars 144 and 148.

Figure 2:
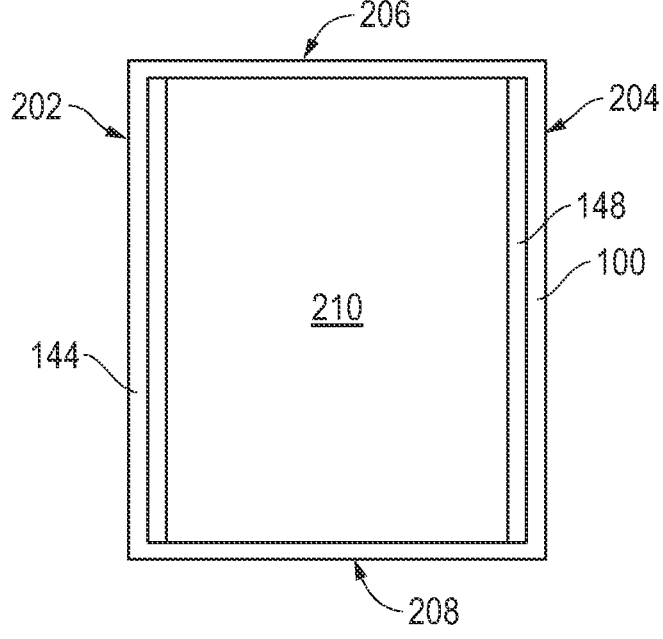
FIG. 2 includes an illustration of a top view of the workpiece of FIG. 1.

FIG. 2 includes a top view of the substrate 100 and a non-light-emitting variable transmission device 210 that includes the layers as described with respect to FIG. 1. The bus bar 144 lies along a side 202 of the substrate 100, and the bus bar 148 lies along a side 204 that is opposite the side 202. Each of the bus bars 144 and 148 have lengths that extend a majority of the distance between a side 206 and a side 208 that is opposite the side 206. In a particular embodiment, each of the bus bars 144 and 148 have a length that is at least 75%, at least 90%, or at least 95% of the distance between the sides 206 and 208. The lengths of the bus bars 144 and 148 are substantially parallel to each other. As used herein, substantially parallel is intended to mean that the lengths of the bus bars 144 and 148 are within 10 degrees of being parallel to each other. Along the length, each of the bus bars has a substantially uniform cross-sectional area and composition. Thus, in such an embodiment, the bus bars 144 and 148 have a substantially constant resistance per unit length along their respective lengths.

B. Light and Color.

When light reaches to a relatively transparent object, such as a window, some of the light is transmitted through the transparent object, some of the light is reflected by the transparent object, and the remainder of the light is absorbed by the transparent object. When the transparent object includes a non-light-emitting, variable transmission device, the transparent object absorbs a relatively lesser amount of light when in a high transmission state, as compared to the non-light-emitting, variable transmission device when in a low transmission state. Along a wall of a building having architectural glass, an observer outside the building can see a color difference between windows when different non-light-emitting, variable transmission devices in different windows are at different transmission states when the coating as described herein is not present. For example, a window in a high transmission state may not have any color or a slight blue-green coloring, and a different in a low transmission state may have a reddish color. The coating as described herein can reduce the appearance of the color difference of the different windows and still provide acceptable luminous transmission.

As used in this specification, color difference, $\Delta E$, is the positive value of the square root of the sum of the difference in CIELab color coordinates between two states, as given in Equation 1.

$$\Delta E = (L*_{21}^2 + a*_{21}^2 + b*_{21}^2)^{0.5}, \qquad \text{Equation 1}$$

where:

$L*_{21}$ is the difference in L* when the article is in its lowest transmission state minus L* when the article is in its highest transmission state, $a*_{21}$ is the difference in a* when the article is in its lowest transmission state minus a* when the article is in its highest transmission state, and $b*_{21}$ is the difference in b* when the article is in its lowest transmission state minus b* when the article is in its highest transmission state.

In this specification, when measuring for L*, a*, and b* coordinates, an external surface of the article is illuminated with a beam coming from a monochromator, whose spectral width is below 5 nm and whose wavelength can be tuned between 250 nm and 2500 nm. The transmission spectra are recorded using an angle of incidence of 0°, the reflection spectra with an angle of incidence of 8°. From these spectra, L*, a* and b* are computed according to the recommendations of the International Commission on Illumination CIE 15.2 1986, using a D65 illuminant and a 2° colorimetric observer. An exemplary spectrophotometer that can be used for the colorimetric observer includes a Lambda 1050™-brand spectrophotometer available from PerkinElmer Inc. of Shelton, CT, USA, a UH5300™-brand spectrophotometer available from Hitachi High Technologies Corp. of Schaumburg, IL, USA, or another suitable UV/visible/near IR spectrophotometer.

As can be seen above, Equation 1 is a square root. In this specification, all references to $\Delta E$ will be to the positive value of the square root. A larger value for $\Delta E$ represents a greater color difference. The threshold for when most humans can observe a color difference occurs when $\Delta E$ is greater than 2. The inventors have discovered a coating that can be used in an article, such as a window, with a non-light-emitting, variable transmission device, where the article has a smaller $\Delta E$ value between high and low transmission states, as compared to conventional windows.

C. Configurations of Articles Including the Non-Light-Emitting, Variable Transmission Device and a Coating.

An article can include a non-light-emitting, variable transmission device and a coating, where the coating is located between an ambient outside the article and the non-light-emitting, variable transmission device. The configurations described and illustrated herein are exemplary, and other configurations may be used without deviating from the scope of the concepts as described herein.

FIG. 3 illustrates a cross-sectional view of a portion an article 300 that includes a coating 310, a transparent substrate 320, and a non-light-emitting, variable transmission device 330. The coating 310 lies closer to an outdoor ambient 340 as compared to the non-light-emitting, variable transmission device 330, and the non-light-emitting, variable transmission device 330 lies closer to the interior 350 of a building, a vehicle, or the like. The substrate 320 can be any of the substrates as describe with respect to the substrate 100 above. Details regarding the non-light-emitting, variable transmission device 330 are described above. The details regarding the coating 310 are described later in this specification. The configuration as illustrated in FIG. 3 is more conceptual, as the non-light-emitting, variable transmission device 330 may not be directly exposed to the interior 350.

FIGS. 4 to 6 include illustrations of configurations of articles that each includes the coating 310 and the non-light-emitting, variable transmission device 330. FIGS. 4 and 5 include configurations that may be implemented in an insulated glass unit (IGU), and FIG. 6 illustrates a configuration that may be used in a vehicle.

FIG. 4 includes a cross-sectional view of a portion of an article 400. In an embodiment, the article 400 is an IGU. The article 400 includes an outer glazing 440 near the outdoor ambient 340, and an inner glazing 450 closer to the interior 350. The coating 310 lies along a surface of the outer glazing 440 that is opposite the surface closer to the outdoor ambient 340. The non-light-emitting, variable transmission device 330 is on the substrate 320. An interlayer 410 is disposed between the substrate 320 and the coating 310.

The non-light-emitting, variable transmission device 330 and substrate 320 can be any of the non-light-emitting, variable transmission devices and substrates previously described with respect to FIGS. 1 and 2. Each of the glazings 440 and 450 can be a toughened or a tempered glass and have a thickness in a range of 3 mm to 12 mm. In an embodiment, each of the substrate 320 and glazings 440 and 450 can have a refractive index in a range of 1.4 to 1.7. In another embodiment, any one or more of the substrate 320 and glazings 440 and 450 can include a low iron glass. As used herein, low iron glass has at most 700 ppm by weight of $Fe_2O_3$.

The low iron glass can help reduce absorbance of light. In a particular embodiment, glazings 440 and 450 can include SSG DIAMANT®-brand glass (registered trademark of Saint-Gobain Glass France) available from Saint-Gobain Glass (United Kingdom) Limited of Yorkshire, England, UK. The interlayer 410 can be an adhesive material. The interlayer 410 can include a thermoplastic, such as polyurethane, ethylene vinyl acetate, polyvinyl butyral, or the like.

An internal space 430 of the article 400 can include a relatively inert gas, such as a noble gas or dry air. In another embodiment, the internal space 430 may be evacuated.

In another embodiment, the positions of the substrate 320 and non-light-emitting, variable transmission device 330 may be reversed. The non-light-emitting, variable transmission device 330 can contact the interlayer 410 and the substrate 320 can have most of one surface exposed to the internal space 430.

FIG. 5 includes an article 500 that is similar to article 400. In an embodiment, the article 500 is an IGU. The non-light-emitting, variable transmission device 330 and substrate 320 are attached to the inner glazing 450 instead of the outer glazing 440. The interlayer 410 is disposed between the substrate 320 and the inner glazing 450. Similar to article 400, in article 500, the positions of the non-light-emitting, variable transmission device 330 and substrate 320 can be reversed such that the non-light-emitting, variable transmission device 330 contacts the interlayer 410.

Although not illustrated, a solar control film, a low-emissivity film, or both may be used. In an embodiment, such film may be located at a variety of different positions between the glazings 440 and 450 for articles 400 and 500.

FIG. 6 includes an article 600 that may be useful for a vehicle. The glazing 640 may include a transparent laminate that can better withstand objects striking it as compared to the glazing 440. In the embodiment as illustrated, the article 600 does not have an interior space. In another embodiment (not illustrated) the article 600 may have an interior space similar to the space 430; however, an interior space for article 600 may be narrower than it is for the articles 400 and 500.

D. Details Regarding the Coating.

The coating can help to provide a relatively low ΔE. The coating can have ΔE of at most 6.5. In an embodiment, the coating has ΔE of at most 6.0, at most 5.5, or at most 5.0. In a particular embodiment, the coating has ΔE of at least 1.0 or at least 2.0. In a particular embodiment, ΔE can be in a range of 2.0 to 5.5. The coating may allow sufficient luminous transmission when the article is in its highest transmission state. In an embodiment, when the article is in its highest transmission state, luminous transmission of light through the article is at least at least 20%, at least 30%, or at least 40%, or at least 50%, and in another embodiment, luminous transmission of light through the article is at least at most 80%, at most 70%, or at most 60%. In general, a lower ΔE may occur at the expense of a lower luminous transmission. Coatings as described herein can provide a good balance between ΔE and luminous transmission. In a particular embodiment, the article can have a ΔE in a range of 2.0 to 5.5 and a luminous transmission in a range of 40% to 60%. After reading this specification, skilled artisans will be able to determine ΔE and luminous transmission that works well for a particular application.

The coating can include a layer having a refractive index of at least 2.2 ("high refractive index layer"). In an embodiment, the refractive index may be at most 5.0. An exemplary material can include a titanium oxide, niobium, a niobium oxide, a niobium nitride, or a silicon-zirconium oxynitride a silicon-zirconium nitride, another suitable high refractive index material, or a mixture thereof. In a particular embodiment, that exemplary material can be mostly or completely made up of $TiO_2$, $Nb_2O_5$, or $Si_xZr_yN_{(4/3)x+y}$, wherein $0.25{\leq}y/(x+y){\leq}0.6$. The thickness of the layer can be at least 10 nm. In an embodiment, the first layer has a thickness of at least 13 nm, at least 17 nm, or at least 20 nm, and in another embodiment, the layer has a thickness of at most 50 nm, at most 40 nm, or at most 30 nm. In a particular embodiment, a thickness less than 17 nm may be insufficient to reduce ΔE in some applications, and a thickness greater than 40 nm may absorb too much light and reduce luminous transmission in other applications.

The coating can include one or more other layers. Such one or more layers may have refractive indices that are the same or less than the refractive index of the previously described layer of the coating.

In an embodiment, a layer of the one or more layers can include a barrier layer. The coating may be formed on a glazing or other mineral glass material that includes an alkali metal, for example, sodium. Referring to FIGS. 4 to 6, the glazing 440, 450, or 640 may include float glass. The barrier layer can be more effective than a silicate material of the same thickness in reducing migration of the alkali metal into the high refractive index layer previously described. In an embodiment, the barrier layer includes a nitride material, and in a particular embodiment, the barrier layer includes $Si_3N_4$, $Si_xZr_yN_{(4/3)x+y}$, wherein $0.1{\leq}y/(x+y){\leq}0.3$, another suitable material layer, or a combination thereof. In an embodiment, the barrier layer has a thickness of at least 11 nm, at least 17 nm, or at least 25 nm, and in another embodiment, the barrier layer has a thickness of at most 50 nm, at most 40 nm, or at most 35 nm. In a particular embodiment, a thickness less than 17 nm may be insufficient to keep migration of alkali metal low, particularly as firing or other processing temperatures become higher. For example, the article may need to be bent or otherwise shape, the temperature used for bending or otherwise shaping the article can exceed 600° C. A thickness greater than 40 nm may absorb too much light and reduce luminous transmission or may affect the color of light transmitted through the coating. In a particular application, the coating may not include the barrier layer.

In another embodiment, the one or more layers can include another layer or set of layers that can help to increase reflection of some of the incoming light. In an embodiment, such one or more different layers can be used in an article having layers of alternating relatively high and low refractive indices. Increasing reflection can reduce $\Delta E$; however, if reflection is too high, luminous transmission may become too low. As described herein, in a particular embodiment, the coating can provide a good balance between $\Delta E$ and luminous transmission. Thickness can affect luminous transmission, so layers within the coating may be relatively thin to keep absorbance relatively low.

One of the layers can have a refractive index of at most 1.7. The refractive index may be at least 1.4. Such layer can include a silicon oxide (for example, deposited $SiO_2$) or a polymer. In an embodiment, the layer has a thickness of at least 1 nm, at least 3 nm, or at least 5 nm, and in another embodiment, the layer has a thickness of at most 30 nm, at most 20 nm, or at most 15 nm. In a particular embodiment, a thickness less than 3 nm may be insufficient to provide the desired reflection in some applications, and a thickness greater than 20 nm may absorb too much light and reduce luminous transmission in other applications.

A further layer of the one or more layers can have a refractive index that is the same or less than the high refractive index layer. In an embodiment, the further layer has a refractive index that is higher than the layer described in the prior paragraph. The further layer can include a titanium oxide, a zirconium oxide, a titanium zirconium oxynitride, or the like. In an embodiment, the further layer has a thickness of at least 1 nm, and in another embodiment, the further layer has a thickness of at most 9 nm, at most 5 nm, or at most 3 nm. In a particular embodiment, a thickness less than 1 nm may be insufficient to provide the desired reflection, and a thickness greater than 5 nm may absorb too much light and reduce luminous transmission.

Thus, the one or more layers are selected to have different refractive indices to improve reflection and thicknesses that do not absorb too much light. The amount of reflection may depend in part on how much light is to be transmitted through the coating.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1. An article can include: a non-light-emitting, variable transmission device; and a coating disposed between the non-light-emitting, variable transmission device and an ambient outside the article, wherein the article has a $\Delta E$ of at most 6.5, wherein: $\Delta E=(L^*_{21}{}^2+a^*_{21}{}^2+b^*_{21}{}^2)^{0.5}$, $\Delta E>0$, $L^*_{21}$ is the difference in $L^*$ when the article is in its lowest transmission state minus $L^*$ when the article is in its highest transmission state, $a^*_{21}$ is the difference in $a^*$ when the article is in its lowest transmission state minus $a^*$ when the article is in its highest transmission state, $b^*_{21}$ is the difference in $b^*$ when the article is in its lowest transmission state minus $b^*$ when the article is in its highest transmission state, measurements for $L^*$, $a^*$, and $b^*$ are taken along the same side of the article as the outer surface.

Embodiment 2. The article of Embodiment 1, wherein $\Delta E$ is at most 6.0, at most, or at most 5.5, or at most 5.0.

Embodiment 3. The article of Embodiment 1 or 2, wherein $\Delta E$ is at least 1.0 or at least 2.0.

Embodiment 4. The article of any one of Embodiments 1 to 3, wherein when the article is in its highest transmission state, luminous transmission of light through the article is at least at least 20%, at least 30%, at least 40%, or at least 50%, Embodiment 5. The article of any one of Embodiments 1 to 4, wherein when the article is in its highest transmission state, luminous transmission is at least at most 80%, at most 70%, or at most 60%.

Embodiment 6. The article of any one of Embodiments 1 to 5, wherein $\Delta E$ is in a range of 2.0 to 5.5.

Embodiment 7. The article of any one of Embodiments 1 to 6, wherein when the article is in its highest transmission state, luminous transmission is in a range of 40% to 60%.

Embodiment 8. The article of any one of Embodiments 1 to 7, wherein the coating includes a plurality of layers including a first layer having a refractive index of at least 2.2 and a thickness of at least 10 nm.

Embodiment 9. An article can include: a non-light-emitting, variable transmission device; and a coating disposed between the non-light-emitting, variable transmission device and an ambient outside the article, wherein the coating includes a plurality of layers including a first layer having a refractive index of at least 2.2 and a thickness of at least 10 nm.

Embodiment 10. The article of Embodiment 8 or 9, wherein the first layer has a refractive index of at most 5.0.

Embodiment 11. The article of Embodiment 9 or 10, wherein the first layer includes a titanium oxide, niobium, a niobium oxide, a niobium nitride, or a silicon-zirconium oxynitride, a silicon-zirconium nitride.

Embodiment 12. The article of any one of Embodiments 8 to 11, wherein the first layer includes $TiO_2$, $Nb_2O_5$, or $Si_xZr_yN_{(4/3)x+y}$, wherein $0.25 \leq y/(x+y) \leq 0.6$.

Embodiment 13. The article of any one of Embodiments 8 to 12, wherein the first layer has a thickness of at least 13 nm, at least 17 nm, or at least 20 nm.

Embodiment 14. The article of any one of Embodiments 9 to 13, wherein the first layer has a thickness of at most 50 nm, at most 40 nm, or at most 30 nm.

Embodiment 15. The article of any one of Embodiments 8 to 14, wherein the coating includes a second layer having a refractive index less than the first layer.

Embodiment 16. The article of Embodiment 15, wherein the second layer is a barrier layer with respect to an alkali metal.

Embodiment 17. The article of Embodiment 15 or 16, wherein the second layer includes a nitride material.

Embodiment 18. The article of Embodiment 15 or 16, wherein the second layer includes $Si_3N_4$ or $Si_xZr_yN_{(4/3)x+y}$, wherein $0.1 \leq y/(x+y) \leq 0.3$.

Embodiment 19. The article of any one of Embodiments 15 to 18, wherein the second layer has a thickness of at least 11 nm, at least 17 nm, or at least 25 nm.

Embodiment 20. The article of any one of Embodiments 15 to 19, wherein the second layer has a thickness of at most 50 nm, at most 40 nm, or at most 35 nm.

Embodiment 21. The article of any one of Embodiments 15 to 20, further including a third layer, wherein the first layer is disposed between the second and third layers.

Embodiment 22. The article of Embodiment 21, wherein the third layer has a refractive index of at most 1.7.

Embodiment 23. The article of Embodiment 21 or 22, wherein the third layer includes a silicon oxide or a polymer.

Embodiment 24. The article of any one of Embodiments 21 to 23, wherein the third layer has a thickness of at least 1 nm, at least 3 nm, or at least 5 nm.

Embodiment 25. The article of any one of Embodiments 21 to 24, wherein the third layer has a thickness of at most 30 nm, at most 20 nm, or at most 15 nm.

Embodiment 26. The article of any one of Embodiments 21 to 25, further including a fourth layer, wherein the third layer is disposed between the first and fourth layers, and the third layer has a refractive index less than the first and fourth layers.

Embodiment 27. The article of Embodiment 26, wherein the refractive index of the fourth layer is the same or less than the first layer.

Embodiment 28. The article of Embodiment 26 or 27, wherein the fourth layer includes a titanium oxide, a zirconium oxide, or a titanium zirconium oxynitride.

Embodiment 29. The article of any one of Embodiments 26 to 28, wherein the fourth layer has a thickness of at least 1 nm.

Embodiment 30. The article of any one of Embodiments 26 to 29, wherein the fourth layer has a thickness of at most 9 nm, at most 5 nm, or at most 3 nm.

Embodiment 31. The article of Embodiment 14, further including a second layer is disposed between the first layer and the non-light-emitting variable transmission device.

Embodiment 32. The article of Embodiment 31, wherein the second layer has a refractive index of at most 1.7.

Embodiment 33. The article of Embodiment 31 or 32, wherein the second layer includes a silicon oxide or a polymer.

Embodiment 34. The article of any one of Embodiments 31 to 33, wherein the second layer has a thickness of at least 1 nm, at least 3 nm, or at least 5 nm.

Embodiment 35. The article of any one of Embodiments 31 to 34, wherein the second layer has a thickness of at most 30 nm, at most 20 nm, or at most 15 nm.

Embodiment 36. The article of any one of Embodiments 31 to 35, further including a third layer, wherein the second layer is disposed between the first and third layers, and the second layer has a refractive index less than the first and third layers.

Embodiment 37. The article of Embodiment 36, wherein the refractive index of the third layer is the same or less than the first layer.

Embodiment 38. The article of Embodiment 36 or 37, wherein the third layer includes a titanium oxide, a zirconium oxide, or a titanium zirconium oxynitride.

Embodiment 39. The article of any one of Embodiments 36 to 38, wherein the third layer has a thickness of at least 1 nm.

Embodiment 40. The article of any one of Embodiments 36 to 39, wherein the third layer has a thickness of at most 9 nm, at most 5 nm, or at most 3 nm.

Embodiment 41. The article of any one of Embodiments 1 to 40, further including a glass substrate disposed between the coating and the non-light-transmission, variable transmission device.

Embodiment 42. The article of Embodiment 41, wherein the glass substrate has a refractive index in a range of 1.4 to 1.7.

Embodiment 43. The article of Embodiment 41 or 42, wherein the glass substrate has a thickness in a range of 50 microns to 4 mm.

Embodiment 44. The article of any one of Embodiments 1 to 43, further including a first glazing, wherein the coating is disposed between the non-light-transmission, variable transmission device and the first glazing.

Embodiment 45. The article of Embodiment 44, wherein the first glazing has a refractive index in a range of 1.4 to 1.7.

Embodiment 46. The article of Embodiment 44 or 45, wherein the first glazing has a thickness in a range of 3 mm to 12 mm.

Embodiment 47. The article of any one of Embodiments 44 to 46, wherein the first glazing has an iron content of at most 700 ppm by weight of $Fe_2O_3$.

Embodiment 48. The article of any one of Embodiments 44 to 47, further including a second glazing, wherein the non-light-transmission, variable transmission device is disposed between the layer and the second glazing.

Embodiment 49. The article of Embodiment 48, wherein the second glazing has a refractive index in a range of 1.4 to 1.7.

Embodiment 50. The article of Embodiment 48 or 49, wherein the second glazing has a thickness in a range of 3 mm to 12 mm.

Embodiment 51. The article of any one of Embodiments 48 to 50, wherein the second glazing has an iron content of at most 700 ppm by weight of $Fe_2O_3$.

Embodiment 52. The article of any one of Embodiments 1 to 51, further including an interlayer disposed between the non-light-transmission, variable transmission device and the coating.

Embodiment 53. The article of Embodiment 52, wherein the interlayer includes an adhesive material.

Embodiment 54. The article of any one of Embodiments 1 to 53, wherein the non-light-emitting, variable transmission device includes an electrochromic layer.

Embodiment 55. The article of Embodiment 54, wherein the non-light-emitting, variable transmission device further includes an ion storage layer and an ion conductive layer disposed between the electrochromic and ion storage layers.

Examples

The concepts described herein will be further described in the Examples, which do not limit the scope of the invention described in the claims. The Examples demonstrate how different constructions of the coating can affect ΔE and luminous transmission. Numerical values as disclosed in this Examples section may be averaged from a plurality of readings, approximated, or rounded off for convenience.

Each of the samples below was part of an article that includes float glass A at 4 mm (including Face 1 and Face 2)/polymeric interlayer at 0.96 mm/clear float glass B at 2.2 mm/electrochromic device/gas-filled region at 12 mm/float glass B at 4 mm. Values above refer to thicknesses. Face 1 refers to the surface of float glass A farther from the electrochromic device, and Face 2 refers to the surface of float glass A farther from the electrochromic device. Float glass A and float glass B have the same composition.

For all samples other than Sample 4, float glass A is SSG PLANICLEAR®-brand glass (registered trademark of Saint-Gobain Glass France) available from Saint-Gobain Glass (United Kingdom) Limited of Yorkshire, England, UK. For Sample 4, float glass A is SSG DIAMANT®-brand glass (registered trademark of Saint-Gobain Glass France) available from Saint-Gobain Glass (United Kingdom) Limited of Yorkshire, England, UK. SSG PLANICLEAR®-brand glass has an iron content of approximately 750 ppm by weight of $Fe_2O_3$, and SSG DIAMANT®-brand glass has an iron content of less than 700 ppm by weight of $Fe_2O_3$. The difference in luminous transmission attributable to the differences in the glasses (between SSG DIAMANT®-brand glass and SSG PLANICLEAR®-brand glass) is 0.7%.

The electrochromic devices in the samples below have the same construction. The surfaces of float glass A are referenced, as some coatings were on one of the faces and other coatings on the opposite face. Layers within the coatings are listed from the layer closer or closest to float glass A. After reading this entire specification, skilled artisans will appreciate that the article does not need to be an IGU.

Comparative Sample 1

Comparative Sample 1 has float glass A without a coating as described herein.

Comparative Sample 2

Comparative Sample 2 has a coating deposited on Face 2 of float glass A, wherein the coating includes a single layer of $Si_3N_4$ at 60 nm thickness.

Sample 1

Sample 1 has a coating deposited on Face 2 of float glass A, wherein the coating includes $Si_3N_4$ at 60 nm thickness/ niobium at 35 nm thickness/$Si_3N_4$ at 30 nm thickness.

Sample 2

Sample 2 has a coating deposited on Face 2 of float glass A, wherein the coating includes $Si_3N_4$ at 10 nm thickness/ NbN at 7 nm thickness/$Si_3N_4$ at 30 nm thickness.

Sample 3

Sample 3 has a coating deposited on Face 1 of float glass A, wherein the coating includes a pyrolytic, $TiO_2$ monolayer at 40 nm thickness.

Sample 4

Sample 4 has a coating deposited on Face 2 of float glass, wherein the coating includes $Si_3N_4$ at 31 nm thickness, $TiO_2$ at 25 nm thickness, $SiO_2$ at 7 nm thickness, and SiZrON at 2 nm thickness.

Articles corresponding to the samples above were tested for $\Delta E$, when the non-light-emitting, variable transmission devices in the articles were at their highest transmission state and at their lowest transmission state. Articles corresponding to the samples above were tested for luminous transmission, when the non-light-emitting, variable transmission devices in the articles were at their highest transmission state. The details regarding measurements for $\Delta E$ and luminous transmission are set forth earlier in this specification.

Table 1 below includes $\Delta E$ and luminous transmission for each of the samples above.

TABLE 1

| | Optical properties of samples | |
| --- | --- | --- |
| Sample | Luminous Transmission (%) | $\Delta E$ |
| Comparative Sample 1 | 66.4 | 10.1 |
| Comparative Sample 2 | 62.9 | 6.7 |
| Sample 1 | 6.4 | 0.3 |
| Sample 2 | 40.3 | 2.6 |
| Sample 3 | 49.8 | 2.8 |
| Sample 4 | 57.7 | 4.5 |

Figure 7:
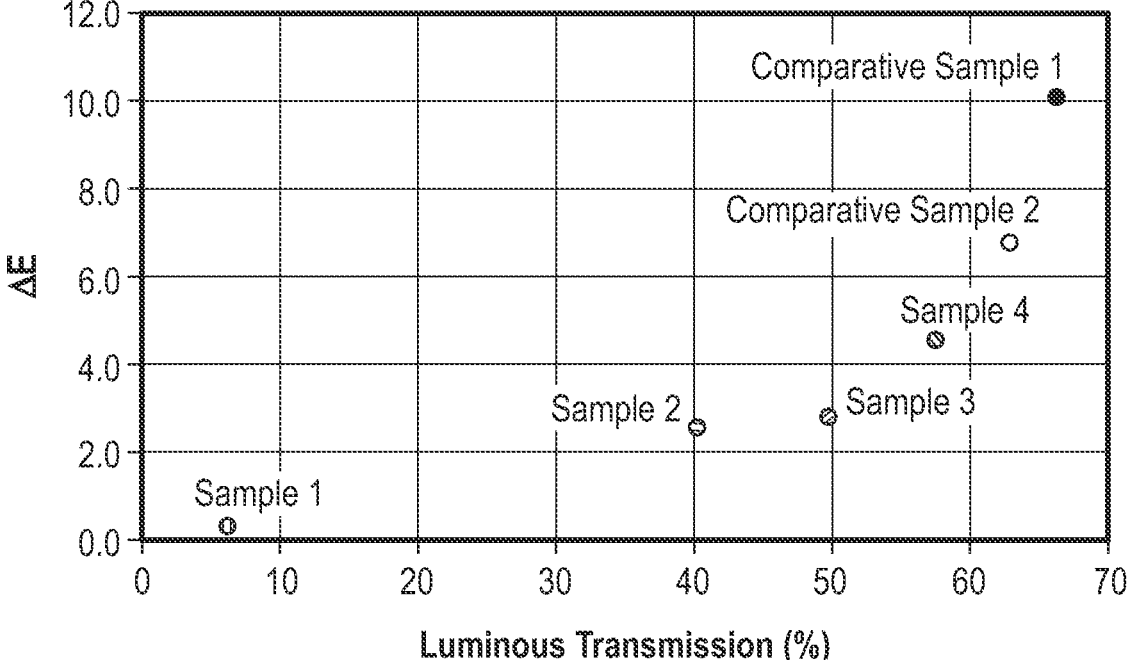
FIG. 7 includes a graph illustrating ΔE and luminous transmission for samples as described in the Examples section of this specification.

FIG. 7 includes a plot of luminous transmission along the x-axis and $\Delta E$ along the y-axis for each of the samples. A larger $\Delta E$ means a greater color difference. A $\Delta E$ value of 2 is a threshold where most humans will observe a color difference between the highest and lowest transmission states. Comparative Sample 1 does not have a coating to reduce the color difference, and thus, Comparative Sample 1 has the highest $\Delta E$. Comparative Sample 1 also has the highest luminous transmission due to the absence of the coating. Comparative Sample 2 has a relatively high $\Delta E$ and relatively high luminous transmission as compared to Samples 1 to 4. Comparative Sample 2 has a significant color difference between its highest and lowest transmission states, and such a color difference may be unacceptable to some users.

Sample 1, which has a coating as previously described in this specification, is near the other end of the spectrum as compared to the Comparative Samples 1 and 2. The $\Delta E$ for Sample 1 is less than 1, and therefore, most humans will not be able to detect any color difference between the highest and lowest transmission states. Sample 1 may be useful when color difference is important and luminous transmission is not too important.

For some users, Samples 2, 3, and 4 may provide a good balance between $\Delta E$ and luminous transmission. Samples 2 and 3 have $\Delta E$ values between 2 and 3, and thus, Samples 2 and 3 have some detectable color change; however, the color change is relatively small as compared to the Comparative Samples 1 and 2 and Sample 4. Sample 3 has a luminous transmission a little over 40%, and Sample 2 has a luminous transmission slightly less than 50%. Sample 4 lies in between the Comparative Samples and other Samples. Sample 4 has a $\Delta E$ value less than 5 and significantly less than Comparative Samples 1 and 2, and has a luminous transmission greater than 55%, and greater than Samples 1 to 3.

Accordingly, Samples 1 to 4 provide for significantly less color change between the highest and lowest transmission states as compared to the Comparative Samples 1 and 2. Users of the articles or incorporating such articles in their own designs can determine which sample provides the best compromise between color difference and luminous transmission for their particular application.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An article comprising:
a non-light-emitting, variable transmission device on a substrate;
a coating disposed between the non-light-emitting, variable transmission device and an ambient outside the article, wherein the coating comprises a plurality of layers including a first layer having a refractive index of at least 2.2 and a thickness of between 17 nm and 40 nm wherein the coating comprises silicon-zirconium oxynitride; and
wherein the article has a color difference delta E($\Delta$E) in the range of 1.0 to 6.5, wherein:

$$\Delta E = (L^*_{21}{}^2 + a^*_{21}{}^2 + b^*_{21}{}^2)^{0.5},$$

$L^*_{21}$ is the difference in L* when the article is in its lowest transmission state minus L* when the article is in its highest transmission state,
$a^*_{21}$ is the difference in a* when the article is in its lowest transmission state minus a* when the article is in its highest transmission state,
$b^*_{21}$ is the difference in b* when the article is in its lowest transmission state minus b* when the article is in its highest transmission state,
measurements for L*, a*, and b* are taken along the same side of the article as the outer surface, wherein L* represents the lightness of color, a* represents a position between red/magenta and green, and b* represents a position between yellow and blue according to CIELab color space, wherein when the article is in its highest transmission state, the article comprises a luminous transmission in a range of 40% to 60%.

2. The article of claim 1, wherein the coating includes a second layer having a refractive index less than the first layer.

3. The article of claim 2, wherein the second layer is a barrier layer with respect to an alkali metal.

4. The article of claim 2, wherein the second layer comprises a nitride material.

5. The article of claim 2, wherein the second layer has a thickness of at least 11 nm and the second layer has a thickness of at most 50 nm.

6. The article of claim 5, wherein the substrate is composed of glass and is disposed between the coating and the non-light-transmission, variable transmission device, wherein the glass substrate has a refractive index in a range of 1.4 to 1.7.

7. The article of claim 2, wherein the second layer has a refractive index of at most 1.7.

8. The article of claim 1, further comprising a second layer is disposed between the first layer and the non-light-emitting variable transmission device.

9. The article of claim 8, further comprising a third layer, wherein the second layer is disposed between the first and third layer.

10. The article of claim 9, wherein the second layer has a refractive index less than the first and third layer.

11. The article of claim 1, wherein the coating is on the substrate.

12. The article of claim 1, wherein the $\Delta$E is in the range of 1.0 to 5.0.

13. The article of claim 1, wherein the $\Delta$E is in the range of 2.0 to 6.5.

14. The article of claim 1, wherein the $\Delta$E is in the range of 1.0 to 6.0.

* * * * *